May 3, 1966 J. VAN GEEN 3,249,892

OSCILLATOR WITH CURRENT RESPONSIVE ELECTROPLATED VARIABLE RESISTANCE CONTROLLING FREQUENCY AND AMPLITUDE

Filed Dec. 30, 1963

INVENTOR.
John Van Geen
BY
Townsend and Townsend
attorneys

United States Patent Office 3,249,892

Patented May 3, 1966

3,249,892

OSCILLATOR WITH CURRENT RESPONSIVE ELECTROPLATED VARIABLE RESISTANCE CONTROLLING FREQUENCY AND AMPLITUDE

John Van Geen, 1108 Hollenbeck Road, Sunnyvale, Calif.

Filed Dec. 30, 1963, Ser. No. 334,407
9 Claims. (Cl. 331—109)

This invention relates to an electrical apparatus capable of integrating an electrical value relative to time in which an output signal is derived having a value which is an analogue of a total input signal received over a predetermined time interval.

The invention employs analogue memory devices which consist of two electrodes carried within an electolytic bath. The first of the electrodes comprises a relatively high resistance element and the second electrode is formed of a low resistance element. When potentials of one polarity are applied to the device, a low resistivity metal film is deposited on the first electrode in proportion to the magnitude of the signal and the time length of its application. A signal of reverse polarity causes a reversal of this process whereby the resistance value between opposite terminals of the first electrode is a direct function of the time polarity magnitude of the input signal.

In such devices the resistance between the two terminals of the first electrode is of relatively low value or impedance. Because of this factor it is difficult to utilize or directly sense the variation of resistance without introducing currents which are likely to cause a disruption or change within the device.

The principal object of this invention is to provide a combination of circuit elements wherein the change of resistance between the terminals of the first electrode of the device can be sensed and converted to a substantially high magnitude and higher impedance output without materially affecting the resistance value of the device. This function is obtained by inductive coupling of the electrode to the tank circuit of an oscillator, whereby the resistance value affects the frequency of the oscillator, whereafter the oscillator output is integrated to obtain a relatively high voltage output which is an analogue of the resistance of the electrode. Thus, voltages for example in the range of 20 volts at 1–5 milliamperes may be provided which can be applied directly to drive other circuits without additional amplification.

One of the advantages of this invention is that the change of resistance of the electrode can be sensed and utilized as a control signal without directly coupling a relatively low impedance circuit to the device. Because of this factor there is a high degree of D.C. isolation between the input to the aforesaid integrating or memory device and the output. Because of the D.C. isolation it is possible to connect a plurality of circuits together while maintaining a high degree of isolation. The inductive coupling also allows the device to operate in the lower resistance values of say from 1 to 100 ohms wherein coupling to the oscillator transformer may be had by as few as one turn of coil winding.

A further feature and advantage of this invention lies in the fact that a stored resistance value of the integrating or memory device can be maintained for an indeterminate length of time and during which time the value can be frequenlty read without disturbing the resistance value.

Still another feature and advantage of this invention is in the provision of means for changing the resistance values by addition or subtraction of input signals while continuously reading the integrated total resistance value at the output electrode.

A still further feature and advantage of this invention lies in the fact that a blocking oscillator with feed-back exhibits extremely high amplification so that a very small variation at the input of the memory device will provide a rather substantial variation at the output. And, as a further feature and advantage, the circuit can exhibit excellent stability.

Another object of the invention is to provide in the aforesaid circuit an output voltage which is a function of the frequency of the oscillator.

A still further feature and advantage of this invention lies in the fact that alternatively a D.C. or a pulse output may be obtained either sequentially, alternatively or simultaneously.

It is important with memory devices of this type to allow plating current to be evenly disposed at both ends of the output electrode so that the plating will be evenly distributed over the electrode. In the present invention the resistance element or electrode is connected to an extremely low resistance winding of the transformer. Because of this feature there will be a more constant plating current and resultant uniformity in plating or deplating.

It is another object of this invention to provide a blocking oscillator having a feed-back of rectified D.C. voltage to create an output signal having higher amplitude.

It is another object of this invention to provide an oscillator in which a resistance changes the load on a tertiary winding in order to vary the coupling of energy between a primary and a secondary winding, comprising the oscillator, so that variations of the resistance provide an output in which the pulse repetition rate and/or the amplitude is a function of the resistance or load across the tertiary winding.

An important feature and advantage of this invention lies in the fact that a resistance value is sensed in a device which provides an alternating current signal which is amplified, rectified and thence the rectified signal is fed back to obtain further amplification and at the same time provides a D.C. output. It is important to convert such resistance values to D.C. current. Because each of these functions appear in a simple blocking oscillator mode there is provided an output which is a consistent function of the input with excellent stability and yet providing the requisite D.C. signal when required.

These and other objects will be apparent from the following description and from the accompanying drawing in which.

Figure 1:
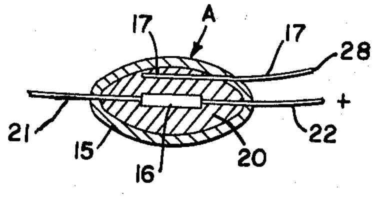
FIG. 1 is a cross-sectional view of the memory cell utilized in this invention.
Figure 2:
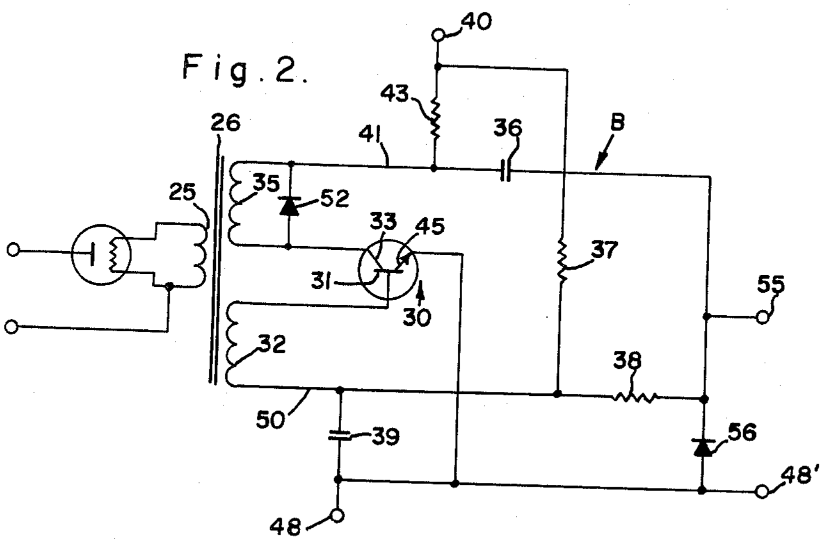
FIG. 2 is a schematic view showing the circuitry of this invention.

The memory cell of this invention indicated at A is formed by a non-conductive capsule or body 15 in which there is provided a read-out electrode 16 and a plating electrode 17. The read-out electrode 16 is formed of a relatively high resistance material. The plating or write electrode 17 on the contrary is formed of a very low resistance material. A liquid electrolyte 20 is provided within the body of the capsule to allow the material forming the plating electrode 17 by electrolysis to be deposited or plated on the receiving or read electrode 16. Specifically, the read electrode can be formed of an agglomerative carbon mass, such as normally comprises the conventional carbon resistor. The plating electrode can, for example, then be formed of copper in which the electrolyte is formed of a solution of copper sulfate and sulfuric acid in about the quantities of 200 gr. per liter of copper sulfate and 70 gr. per liter of sulfuric acid ($H_2SO_4$). To this solution a suitable wetting agent or surface active agent such as sugar can be added. The pH is preferably adjusted to obtain the highest possible plating efficiency to eliminate the generation of gas during the electrolysis process. In operation, when a current is applied between the two electrodes 16 and 17 in which the electrode 17 is of positive potential and the electrode 16 is of negative potential there will be a plating of copper onto the carbon body forming the electrode 16. The thin film of copper deposited on the carbon body of electrode 16 forms a surface of substantially lower resistance which is inversely proportional to the thickness of the copper coating. In this device the thickness of the copper coating will increase and thence the resistance between the two terminals 21 and 22 of the read-out electrode 16 will become increasingly less as the plating process continues.

It can thus be seen that the device will exhibit a time integrating function due to the fact that the resistance between the two terminals 21 and 22 will be of a value determined by the time current integral between the two electrodes 16 and 17. Thus, in operation the resistance between terminals 21 and 22 will reflect an additive or integrated time current analogue for control purposes. It is believed obvious that the cell can take on other configurations, such as, for example, the resistance or read electrode 16 can be formed of thin glass plated with a noble metal, for example, platinum or oxides of tin and the like. The emitting or plating electrode can be formed of silver with a suitable change of electrolyte. The necessity for 100% electrolysis can be alleviated if the device is arranged to operate outside of an enclosed capsule. However, for practical purposes it is desirable to have the cell operate with 100% electrolysis in capsulized form.

In this invention the two terminals 21 and 22 are connected to a transformer winding 25 of a transformer 26. One of the two terminals 21 or 22 and the terminal lead 28 of electrode 17 provide the input terminals for memory cell A. Transformer 26 is arranged to control a blocking oscillator so that the voltage output or frequency of the oscillator can be used to provide a relatively high voltage signal upon appropriate integration to control additional circuitry. The oscillator, generally indicated at B, is arranged so that the resistance between the two terminals of coil 25 will affect the pulse repetition rate or frequency of the oscillator. Oscillator B generally comprises a transistor 30 having its base 31 connected to a coil winding 32 of transformer 26. The collector 33 of transistor 30 is connected to another winding 35 of transformer 26. The opposite end of winding 35 is connected through a coupling capacitor 36 to an R.C. time constant network comprising resistors 37, 38 and condenser 39 in which resistor 37 is connected to the positive power source at 40. D.C. power is also supplied on the opposite side of coil 35 at 41 through a resistor 43. The emitter 45 of transistor 30 is connected to the negative terminal of the power source 48. The opposite end 50 of coil 32 is connected through condenser 39 to ground or negative terminal 48 and to the junctures of resistors 37 and 38 to complete the oscillator circuit. A protective diode 52 is provided between the two terminals of winding 35 of transformer 26 to overcome voltage such as which might be harmful to transistor 30. The output from the oscillator is obtained between the ground terminal 48′ and terminal 55 which connects between the coupling capacitor 36 and resistor 38. A rectifying diode 56 is connected between the two terminals 48′ and 55 to rectify the output from the oscillator and deliver a D.C. voltage which is related to the oscillator frequency.

Figure 3:
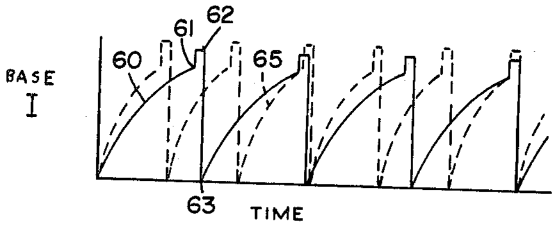
FIG. 3 is a view showing the wave form of the base voltage.

In operation, the base current is applied through resistor 37 to charge condenser 39. As the condenser charges there is provided base current through secondary winding 32 to the base 31 of transistor 30. When the base current reaches a sufficient value to allow conductivity of the transistor there is collector current then beginning to flow through the primary winding 35 of transformer 26. The current developed in the primary winding is induced into the secondary winding 32 which raises the base current to create further amplification of the effect and which results in the transistor 30 going immediately into saturation. When this occurs the field in secondary 32 collapses which causes a reverse charge to appear on condenser 39 which in turn causes the transistor 30 to immediately drop out of conduction. The effect is seen in the wave form illustrated in FIG. 3 in which the base current is represented by line 60 whereat it can be seen that the point of transistor conduction is at 61 wherein there is an immediate raise of base current to the saturation point at 62 and thence an immediate return to the zero point at 63. The output at the time between the point of conduction and cut-off is coupled by condenser 36 and rectified by diode 56. The rectified D.C. is then passed through resistor 38 to immediately start the cycle repetition. The value of resistor 38 is approximately ten times lower than resistor 37 so that the effect of the rectified voltage across resistor 38 has the dominant effect on the charging cycle of condenser 39.

As the load is applied across the tertiary winding 25 due to the increase of conductance of electrode 16, a portion of the field created in primary winding 35 is absorbed by the tertiary winding 25. This will cause the collector current to be of shorter duration and at a higher frequency and amplitude. This exists because there is less energy transferred from the primary 35 to the secondary 32 so that when the transistor goes into saturation there will be a lower reverse charge effect on capacitor 39 while at the same time the D.C. voltage across resistor 38, which is applied to recharge capacitor 39, can thus function more rapidly to effect the re-cycling. This effect is seen at dotted line 65 of FIG. 3. It can thus be seen that the amplitude and pulse repetition or frequency rate is determined by the time constant of the R.C. circuit comprising condenser 39 and resistor 37, but more principally resistor 38 and the voltage applied to resistor 38 which is a resultant rectified D.C. voltage.

Voltage across capacitor 39 is therefore a result of the amount of supply voltage and the rectified voltage appearing at the output terminal across diode 56 and in opposition to the opposite voltage derived from the current pulse at base 31 of transistor 30 at the instant the transistor goes into saturation. It can be seen also that the D.C. component of the current flowing in resistor 38, as a result of rectification of the pulse by diode 56 has a sign such that at a given pulse frequency base 31 of transistor 30 will be driven in the forward condition sooner than would be the case if no pulses would be applied to the rectifier circuit. In this circuit therefore the resistance afforded across winding 25 will change the pulse frequency of the oscillator circuit in such a way that when the resistance across the winding 25 is lowered the collector current pulse will be of shorter duration and at a higher frequency and amplitude.

As can be seen, the circuit provides a feed-back effect in which any increase in the rectified voltage results in a further increase of the pulse repetition rate or frequency thus resulting in effective high amplification of the effect of changes of resistance across the transformer winding 25. As a result of this effect a relatively small change of resistance of the read electrode 16 will result in a large change of the output voltage appearing across terminals 48′ and 55. In this circuit such an output voltage can be in the range of 20 volts at 1–5 milliamperes which can be directly used to control electrical or electronic circuits.

It can also be seen that the memory cell C is capable of operating in either direction in that a negative voltage applied to electrode 17 and a positive voltage applied to electrode 16 will cause a deplating of electrode 16 and thence an increase of the resistance value while a reversal of the current will cause the opposite to occur. Because of the extreme sensitivity and amplification afforded by this device extremely small shifts or changes at the input will provide a reliable constant output. It is also apparent that there will be negligible current appearing across the read electrode 16. Thus, there will not be applied to the cell any current through transformer winding 25 which could effect a plating or deplating operation of the device. Thus, the input to the memory cell and the output to the oscillator are effectively isolated. The coil 25 may have as low as one turn so that there is an effective short circuit or extremely low resistance or impedance across electrode 16. For this reason there will be uniform plating at both ends and the body of the read electrode, thus eliminating a possible cause of drift which could result, if the two terminals 21 and 22 were connected, to a relatively high impedance output.

Although one embodiment of this invention has been described in detail for purposes of explanation, it should be understood that other changes can be made in the structural detail, shape and design without departing from the scope of the invention as set forth in the appended claims.

I claim:

1. A current-time integrator comprising the combination of a first electrode formed of a highly resistive material and a second electrode formed of a highly conductive material, an electrolyte bath in contact with both said electrodes to allow electro-plating of the metal of said second electrode between said electrodes when electrical current is connected to said electrodes, said first electrode having two terminals completing a circuit thereinbetween through the resistive material forming said electrode, an oscillator having an inductance and means to vary the pulse repetition rate of said oscillator by effecting the load across a portion of said inductance, and said two terminals of said first electrode being connected to form the controlling load of said inductance.

2. A current-time integrator, comprising the combination of a first electrode formed of a highly resistive material and a second electrode formed of a highly conductive material, an electrolyte bath in contact with both said electrodes to allow electro-plating of the metal of said second electrode between said electrodes when electrical current is connectd to said electrodes, said first electrode having two terminals completing a circuit therebetween through the resistive material forming said electrode, an oscillator, a transformer in said oscillator having three windings, two of said windings being directly connected to the oscillator to couple energy from the first of said windings to the second of said windings to determine the frequency of said oscillator, the third of said windings operable to change the frequency of said oscillator as a function of the resistance across said winding, the two terminals of said first electrode being connected to said third winding, whereby the frequency of said oscillator is a function of the resistance between the two terminals of said first electrode.

3. In an oscillator circuit, the combination of an active element having a control means and output means in which current appearing at said output means is a function of the current appearing at the input means, a transformer having a primary and a secondary winding, said secondary winding being connected to the input means of said active device, integrating means connected to integrate current applied to said secondary winding, means applying a direct current to said integrating means and said secondary winding, said secondary winding being coupled to the output means to cause said oscillator to oscillate to generate an alternating current component, a rectifier, means coupling the alternating current component through said primary to said rectifier to rectify the alternating current component to obtain a rectified direct current, and means coupling the rectified direct current to said integrating means.

4. In an oscillator circuit, the combination of an active element having a control means and output means in which current appearing at said output means is a function of the current appearing at the input means, a transformer having a primary and a secondary winding, said secondary winding being connected to the input means of said active device, integrating means connected to integrate current applied to said secondary winding, means applying a direct current to said integrating means and said secondary winding, said secondary winding being coupled to the output means to cause said oscillator to oscillate to generate an alternating current component, a rectifier, means coupling the alternating current component through said primary to said rectifier to rectify the alternating current component to obtain a rectified direct current, means coupling the rectified direct current to said integrating means, and means to change the coupling between said primary and said secondary windings of said transformer.

5. In an oscillator circuit, the combination of an active element having a control means and output means in which current appearing at said output means is a function of the current appearing at the input means, a transformer having a primary and a secondary winding, said secondary winding being connected to the input means of said active device, integrating means connected to integrate current applied to said secondary winding, means applying a direct current to said integrating means and said secondary winding, said secondary winding being coupled to the output means to cause said oscillator to oscillate to generate an alternating current component, a rectifier, means coupling the alternating current component through said primary to said rectifier to rectify the alternating current component to obtain a rectified direct current, means coupling the rectified direct current to said integrating means, means to change the coupling between said primary and said secondary windings of said transformer, said latter mentioned means being a tertiary winding on said transformer formed to draw current from said primary winding as a direct function of the load across said winding, and resistance means connected across said tertiary winding whereby the coupling between said primary and said secondary winding is a function of the value of the resistance across said tertiary winding.

6. An oscillator comprising a transformer having a primary, secondary and tertiary winding, said primary winding adapted to induce to said secondary winding, active means connected to allow current flow in said secondary winding to be a function of the change in current flow in said primary winding when the current flow in said secondary winding is over a predetermined minimum and until said current flow is at a predetermined maximum, integrating means connected to discharge to said active means through said secondary winding, power source means connected to energize said active means through said primary winding and connected to said integrating means to cause said integrating means to integrate current from that power source means to cause said circuit to oscillate to provide an alternating current component, rectifier means, means coupling the alternating current component to said rectifier to obtain a rectified direct current, and means coupling said rectified direct current to said integrating means, said tertiary winding constructed and arranged to limit the coupling between the primary and secondary windings as a function of the load across the tertiary winding.

7. A current-time integrator comprising the combination of a first electrode formed of a highly resistive material and a second electrode formed of a highly conductive material, an electrolyte bath in contact with both said electrodes to allow electro-plating of the metal of said second electrode between said electrodes when electrical current is connected to said electrodes, said first electrode having two terminals completing a circuit therebetween through the resistive material forming said electrode, a transformer having a primary, secondary and tertiary winding, said primary winding adapted to induce a current in said secondary winding, active means connected to allow current flow in said secondary winding to be a function of the change in current flow in said primary winding when the current flow in said secondary winding is over a predetermined minimum and until said current flow is at a predetermined maximum, integrating means connected to discharge to said active means through said secondary winding, power source means connected to energize said active means through said primary winding and connected to said integrating means to cause said integrating means to integrate current from that power source means to cause said circuit to oscillate to provide an alternating current component, rectifier means, means coupling the alternating current component to said rectifier to obtain a rectified direct current, and means coupling said rectifying direct current to said integrating means, said tertiary winding constructed and arranged to limit the coupling between the primary and secondary windings as a function of the load across the tertiary winding, said tertiary winding being connected to the two terminals of said first electrode, whereby the resistance through said first electrode will vary the coupling between said primary and secondary winding.

8. A current-time integrator according to claim 7 and wherein said integrating means comprises a capacitor.

9. A current-time integrator comprising the combination of a first electrode formed of a highly resistive material and a second electrode formed of a highly conductive material, an electrolyte bath in contact with both said electrodes to allow electro-plating of the metal of said second electrode between said electrodes when electrical current is connected to said electrodes, said first electrode having two terminals completing a circuit thereinbetween through the resistive material forming said electrode, an oscillator having a variable pulse repetition rate of said oscillator by effecting the load to said oscillator, and said two terminals of said first electrode being connected to form the controlling load of said oscillator.

No references cited.

ROY LAKE, *Primary Examiner.*

S. H. GRIMM, *Assistant Examiner.*